No. 842,141. PATENTED JAN. 22, 1907.
C. F. FRAZEE.
DETACHABLE SAW HANDLE.
APPLICATION FILED OCT. 16, 1905.
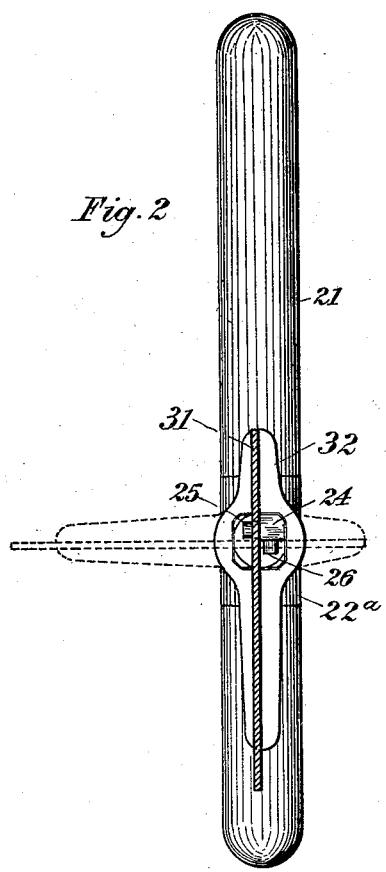
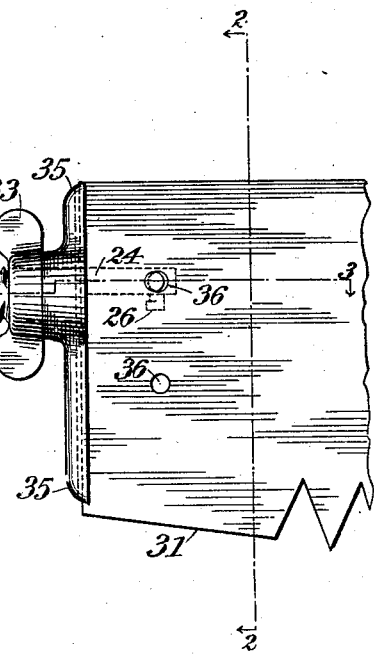
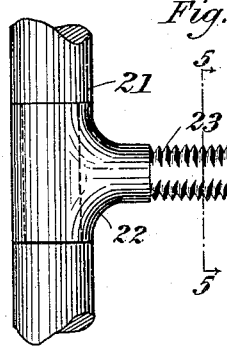
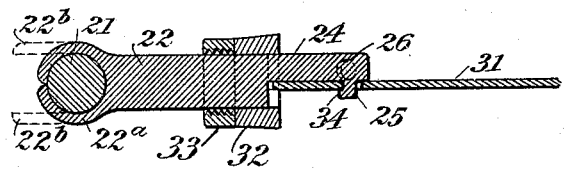
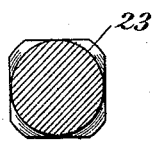
Witnesses.
Alpha A. Turner.
W. A. Cleland.
Inventor
Cassius F. Frazee
By; T. J. Geisler
Attorney.
THE NORRIS PETERS CO., WASHINGTON, D. C.

UNITED STATES PATENT OFFICE.

CASSIUS F. FRAZEE, OF PORTLAND, OREGON, ASSIGNOR TO E. C. ATKINS & CO., OF INDIANAPOLIS, INDIANA, A CORPORATION.

DETACHABLE SAW-HANDLE.

No. 842,141.   Specification of Letters Patent.   Patented Jan. 22, 1907.

Application filed October 16, 1905. Serial No. 282,958.

*To all whom it may concern:*

Be it known that I, CASSIUS FREMONT FRAZEE, a citizen of the United States, residing at Portland, in the county of Multnomah and State of Oregon, have invented new and useful Improvements in Detachable Saw-Handles, of which the following is a specification.

This invention has for its object to provide a convenient, readily-attachable, and inexpensively-made handle for saws, such as the crosscut type, and also to embody therein means by which the relative position of the handle with respect to the saw-blade may be varied from the vertical to the horizontal, as found convenient.

My invention further has for its object to arrange the attachment of the wooden hand-grip piece to the shank of the handle in such wise that the outer surface shall present neither elevation nor depression, but instead shall be a continuous smooth surface comfortable for the hand of the operator, and at the same time to prevent the handle shifting up or down out of place in service.

To attain these objects, my invention comprises the features shown in the illustrations of the drawings constituting a part of the specification and representing as follows:

Figure 1 is a side elevation of my improved handle, showing the same attached to a saw-blade, as in practice, in one of its two positions. Fig. 2 is a section taken transversely of the saw on line indicated by 2 2 in Fig. 1 and looking in the direction indicated by arrows. Fig. 3 is a horizontal section on line 3 3 of Fig. 1 looking downward as indicated by arrows. Fig. 4 is a partial view of the hand-grip piece and the shank to which the same is attached, the bearing-head 32 and nut 33, removably mounted on the shank, being omitted; and Fig. 5 is a transverse section, on a larger scale, on line 5 5 of Fig. 4 looking forward.

My invention consists of a shank 22, which is a casting made with a T-shaped socket portion 22$^a$, comprising two malleable members 22$^b$. The shank is further made with a threaded portion 23, which is substantially square in cross-section for the reasons below stated, and a projecting integral member or tang 24 about one-fourth, in cross-section, the size of the shank and positioned in one corner thereof, as shown in Fig. 2. The tang 24 is made with two straight faces disposed at right angles to each other and provided with projecting lugs 25 26, made with locking-heads 34, respectively.

The wooden hand-grip piece 21 is made with a peripheral recess a little below the middle, and around such recessed part the members 22$^b$ are bent, so as to tightly grip the piece 21.

The parts are so constructed that when the hand-grip piece has been fixed in the socket of the shank as described the exterior surfaces of both will be in unbroken alinement—that is, present a continuous even surface—so as to afford a convenient grip to the sawyer. The same manner of affixing the hand-grip piece to the shank also prevents the former working up out of its socket while using the saw.

On the threaded portion 23 of the shank is mounted a movable bearing-head 32 and a winged jam-nut 33. The bearing-head 32 is made with projecting members 35 35 and a square opening by which it is adapted to be slipped off and on the square threaded portion 23 of the shank to change the position of the grip-piece of the handle with respect to the saw-blade, as may be convenient to the work in hand, and the bearing-faces of the members 35 have grooves extending lengthwise thereof, adapted to fit over and engage with the end edge of the saw-blade.

In attaching my handle to the saw-blade so as to be in line therewith the stud 25 is inserted through one of the holes 36 usually provided in the saw-blade end, and the winged nut is then screwed up so as to cause the bearing-head 32 to engage with the saw end, as shown in Figs. 1 and 3, in doing which the blade is moved forward and becomes engaged with the locking-head 34 of the stud 25, by which it is rigidly held to the vertical inner face of the tang 24.

The square construction in cross-section of the part 23 of the shank and the conforming shape of the opening in the bearing-head 32 are provided to hold the latter against turning on the shank, and by so doing preventing the same from imposing any torsional strain on the blade end, which is apt to be caused if the bearing-head were not held rigidly in place as described, and instead should be partially rotated while using the saw.

In order to change the position of my handle from being in line with the saw-blade to a position at right angles with the same, as indicated in dotted outline in Fig. 2, it is but necessary to loosen the nut 33, so as to be able to disengage the saw-blade from the stud 25 of the tang 24, and the saw-blade may then be turned at right angles and engaged with the stud 26 on the other face of the tang. The bearing-head 32 would also have to be turned at right angles on the shank of the handle and the parts then locked by tightening the nut 33, as in the first place.

I claim—

1. In a saw-handle, the combination of a shank made with a threaded head having squared sides, a tang as 24, projecting from one corner of such head, and made with two faces, disposed at right angles to each other and provided with locking-studs 25, 26, respectively, arranged to interlock with the end of a saw-blade, a movable bearing-head, adapted to engage with the edge of the saw-blade end, and made with an opening which fits said squared portion of the shank, and a jam-nut to force the bearing-head against the saw end.

2. In a saw-handle, the combination of a shank made with a threaded head having right-angular, cut-away side faces, a tang as 24, projecting from one corner of such head, and made with two faces disposed at right angles to each other and provided with locking-studs 25, 26, respectively, arranged to interlock with the end of a saw-blade; a movable bearing-head adapted to engage with the edge of the saw-blade end, and made with an opening adapting such bearing-head to be placed on said shank-head in either one of the two positions at right angles to each other; and a jam-nut to force the bearing-head against the saw end.

In testimony whereof I have hereunto affixed my signature in the presence of two witnesses.

CASSIUS F. FRAZEE.

Witnesses:
T. J. GEISLER,
ALPHA A. TURNER.